(12) United States Patent
Park (10) Patent No.: US 10,686,342 B2
(45) Date of Patent: Jun. 16, 2020

(54) ROTOR FOR WOUND-ROTOR MOTOR AND WOUND-ROTOR MOTOR HAVING THE SAME

(71) Applicant: MANDO CORPORATION, Pyeongtaek-si, Gyeonggi-do (KR)

(72) Inventor: Seung Young Park, Yongin-si (KR)

(73) Assignee: MANDO CORPORATION, Pyeongtaek-si, Gyeonggi-Do (KR)

( * ) Notice: Subject to any disclaimer, the term of this patent is extended or adjusted under 35 U.S.C. 154(b) by 84 days.

(21) Appl. No.: 15/837,937

(22) Filed: Dec. 11, 2017

(65) Prior Publication Data

US 2018/0166935 A1   Jun. 14, 2018

(30) Foreign Application Priority Data

Dec. 14, 2016 (KR) .................. 10-2016-0170395

(51) Int. Cl.
| | |
|---|---|
| *H02K 21/12* | (2006.01) |
| *H02K 1/27* | (2006.01) |
| *H02K 1/24* | (2006.01) |
| *H02K 1/26* | (2006.01) |
| *H02K 3/47* | (2006.01) |
| *H02K 3/52* | (2006.01) |
| *H02K 21/20* | (2006.01) |
| *H02P 6/08* | (2016.01) |

(52) U.S. Cl.
CPC ............. *H02K 1/2773* (2013.01); *H02K 1/24* (2013.01); *H02K 1/243* (2013.01); *H02K 1/265* (2013.01); *H02K 3/47* (2013.01); *H02K 3/528* (2013.01); *H02K 21/20* (2013.01); *H02P 6/08* (2013.01); *H02K 2213/03* (2013.01)

(58) Field of Classification Search
CPC .......... H02K 1/24; H02K 1/243; H02K 1/265; H02K 1/2773; H02K 21/20; H02K 2213/03; H02K 3/47; H02K 3/528; H02P 6/08
USPC ..................................................... 310/156.57
See application file for complete search history.

(56) References Cited

U.S. PATENT DOCUMENTS

| 8,026,648 B2 | 9/2011 | Abel et al. |
| 8,513,850 B2 | 8/2013 | Evans et al. |
| (Continued) | | |

FOREIGN PATENT DOCUMENTS

| CN | 101669266 B | 8/2013 |
| CN | 105634165 A | 6/2016 |

OTHER PUBLICATIONS

Office Action issued in corresponding Chinese Patent Application No. 201711337035.4 dated Jul. 2, 2019 (with English translation).

*Primary Examiner* — Yuriy Semenenko (74) *Attorney, Agent, or Firm* — Morgan, Lewis & Bockius LLP (57) ABSTRACT

Disclosed herein is a rotor for a wound-rotor motor. The rotor for a wound-rotor motor includes: a rotor core including a hollow formed in a central portion thereof and coupled to a shaft; a teeth portion radially formed on an outer side surface of the rotor; and a pole shoe formed to extend from an end portion of the teeth portion in one direction and including a part of a cross section of an outer side surface formed in an arc shape of a first imaginary circle (C1) having a first radius (r1) which is a distance from a central point (CP1) of the hollow to an outermost position (P1) thereof.

15 Claims, 7 Drawing Sheets

(56) References Cited

U.S. PATENT DOCUMENTS

| | | | | |
|---|---|---|---|---|
| 2004/0046479 A1* | 3/2004 | Haga | ......................... | H02K 1/24 |
| | | | | 310/269 |
| 2005/0006962 A1* | 1/2005 | Horng | .................... | H02K 5/163 |
| | | | | 310/51 |
| 2005/0264125 A1* | 12/2005 | Yang | ....................... | H02K 1/165 |
| | | | | 310/216.004 |
| 2006/0214528 A1* | 9/2006 | Nakahara | ................. | H02K 1/24 |
| | | | | 310/156.49 |
| 2013/0141031 A1* | 6/2013 | Yamada | ................. | G05B 19/23 |
| | | | | 318/603 |
| 2016/0322871 A1 | 11/2016 | Lee | | |

* cited by examiner

ROTOR FOR WOUND-ROTOR MOTOR AND WOUND-ROTOR MOTOR HAVING THE SAME

CROSS-REFERENCE TO RELATED APPLICATION

This application claims priority to and the benefit of Korean Patent Application No. 10-2016-0170395, filed on Dec. 14, 2016, the disclosure of which is incorporated herein by reference in its entirety.

BACKGROUND

1. Field of the Invention

The present invention relates to a rotor for a wound-rotor motor and a wound-rotor motor having the same.

2. Discussion of Related Art

Generally, vehicles include starter motors configured to start an engine and alternators configured to generate electricity using a rotary force of the engine. When a driver starts a vehicle, an ignition switch is connected to a power source of a battery by an operation of the driver, a driving force generated by a starter motor supplied with power rotates an engine, and thus the vehicle is started.

In comparison, an alternator, which is connected to a driving portion of an engine, charges a battery with alternating current (AC) power using a rectifier or the like, wherein the AC power is generated by a rotor rotating in a state in which a magnetic field is generated through a driving force of the engine.

Since such a starter motor and such an alternator are both formed to have a structure including a stator and a rotor, the structures thereof may be very similar to each other, and the structures may serve as a power generator or motor according to whether a force is applied or power is applied thereto.

Recently, a belt driven starter generator (hereinafter, referred as a BSG) capable of serving as a starter motor and an alternator with one structure is being actively studied.

Meanwhile, the number of coil windings or a current should be increased to increase a torque of a motor. However, in the case of the BSG, since a spatial limitation is big to increase the number of coil windings and an increase in current is limited, there is a problem in that an increase in torque of the motor is limited.

In addition, in the case of a rotor including a plurality of arrays, when an ideal curve, such as a generally known inverse cosine, is applied to the rotor, there is a problem in that an air gap increases exponentially and a magnitude of a counter electromotive force decreases.

SUMMARY OF THE INVENTION

The present invention is directed to a rotor for a wound-rotor motor for improving a total harmonic distortion (THD) while a magnitude of a counter electromotive force is constantly maintained, and a wound-rotor motor having the same.

According to an aspect of the present invention, there is provided a rotor for a wound-rotor motor including: a rotor core including a hollow formed in a central portion thereof and coupled to a shaft; a teeth portion radially formed on an outer side surface of the rotor; and a pole shoe formed to extend from an end portion of the teeth portion in one direction and including a part of a cross section of an outer side surface formed in an arc shape of a first imaginary circle (C1) having a first radius (r1) which is a distance from a central point (CP1) of the hollow to an outermost position (P1) thereof.

The teeth portion and the pole shoe may include n teeth portions and n pole shoes, the n teeth portions may be disposed on an outer circumferential surface of the rotor core in a circumferential direction to be spaced 360/n degrees from each other, and winding regions in which coils are wound may be formed between the n teeth portions.

When an outer side surface of each of the n pole shoes extends from one end position to the other end position of the pole shoe at a first rotation angle in a direction in which the rotor rotates, the first rotation angle may range from 18° to 45°.

A part of a cross section of the outer side surface of the pole shoe may be formed in an arc shape of a second imaginary circle (C2) having a second central point (CP2) and a second radius (r2), the second imaginary circle may be internally tangent to the first imaginary circle at a first intersection point, and the second central point (CP2) may be spaced apart from a central point (CP1) of the first imaginary circle by a difference between the first radius and the second radius.

The second radius (r2) may range from 60% of the first radius (r1) to 80% of the first radius (r1).

The second radius (r2) may range from 50% of the first radius (r1) to 70% of the first radius (r1).

At least of a part of a cross section of the outer side surface of the pole shoe may be formed in an arc shape of a third imaginary circle (C3) having a third central point (CP3) and a third radius (r3), and the third imaginary circle may be externally tangent to the second imaginary circle at a second intersection point.

The third radius (r3) may range from 110% of the first radius (r1) to 125% of the first radius r1.

At least a part of a cross section of the outer side surface of the pole shoe may be formed in an arc shape of a third imaginary circle (C3) having a third central point (CP3) and a third radius (r3), and the third imaginary circle may be internally tangent to the second imaginary circle at a second intersection point.

The third radius (r3) may range from 10% of the first radius (r1) to 30% of the first radius (r1).

Each of the first rotation angle, a second rotation angle, and a third rotation angle may be an angle at which a first imaginary line, which passes the one end position of the pole shoe and the central point (CP1), is inclined in a rotational direction of the rotor.

The second central point may be positioned on a second imaginary line spaced the second rotation angle from the first imaginary line in the rotational direction of the rotor and configured to extend from the first central point.

The third central point may be positioned on a third imaginary line spaced the third rotation angle from the first imaginary line in the rotational direction of the rotor and configured to extend from the first central point.

The second rotation angle may range from 10% of the first rotation angle ($\theta1$) to 20% of the first rotation angle ($\theta1$).

The second rotation angle may range from 40% of the first rotation angle ($\theta1$) to 50% of the first rotation angle ($\theta1$).

The third rotation angle may range from 80% of the first rotation angle ($\theta1$) to 90% of the first rotation angle ($\theta1$).

The third rotation angle may range from 60% of the first rotation angle ($\theta1$) to 70% of the first rotation angle ($\theta1$).

A cross section from the one end position of the pole shoe to the first intersection point (m1) of the outer side surface of the pole shoe may be formed in the arc shape of the first imaginary circle (C1), a cross section from the first intersection point (m1) to the second intersection point (m2) may be formed in the arc shape of the second imaginary circle (C2), and a cross section from the second intersection point (m2) to the other end position of the pole shoe may be formed in the arc shape of the third imaginary circle (C3).

A cross section from the one end position of the pole shoe to an outermost position of the pole shoe may be formed in the arc shape of the first imaginary circle (C1), a cross section from the outermost position of the pole shoe to the second intersection point (m2) may be formed in the arc shape of the second imaginary circle (C2), and a cross section from the second intersection point (m2) to the other end position of the pole shoe may be formed in the arc shape of the third imaginary circle (C3).

According to another aspect of the present invention, there is provided the above-described wound-rotor motor including a rotor for a wound-rotor motor and a stator formed to cover an outer circumferential surface of the rotor and disposed to be spaced apart from the outer circumferential surface of the rotor.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Hereinafter, embodiments that are easily performed by those skilled in the art will be described in detail with reference to the accompanying drawings. The present invention may be implemented in several different forms, and is not limited to the embodiments described herein. Parts irrelevant to description are omitted in the drawings in order to clearly describe the embodiments of the present invention. The same or similar parts are denoted by the same reference numerals throughout this specification.

It will be further understood that the terms "comprise," "comprising," "include," and/or "including," when used herein, specify the presence of stated features, numbers, steps, operations, elements, components, and/or groups thereof, but do not preclude the presence or addition of one or more other features, numbers, steps, operations, elements, components, and/or groups thereof. In addition, it will be understood that, when a component, such as a layer, a film, a region, or a plate, is referred to as being "on" another component, the component may be directly on the another component or intervening components may be present thereon. On the contrary, it will also be understood that, when a component, such as a layer, a film, a region, or a plate, is referred to as being "under" another component, the component may be directly under the another component or intervening components may be present thereunder.

Figure 1:
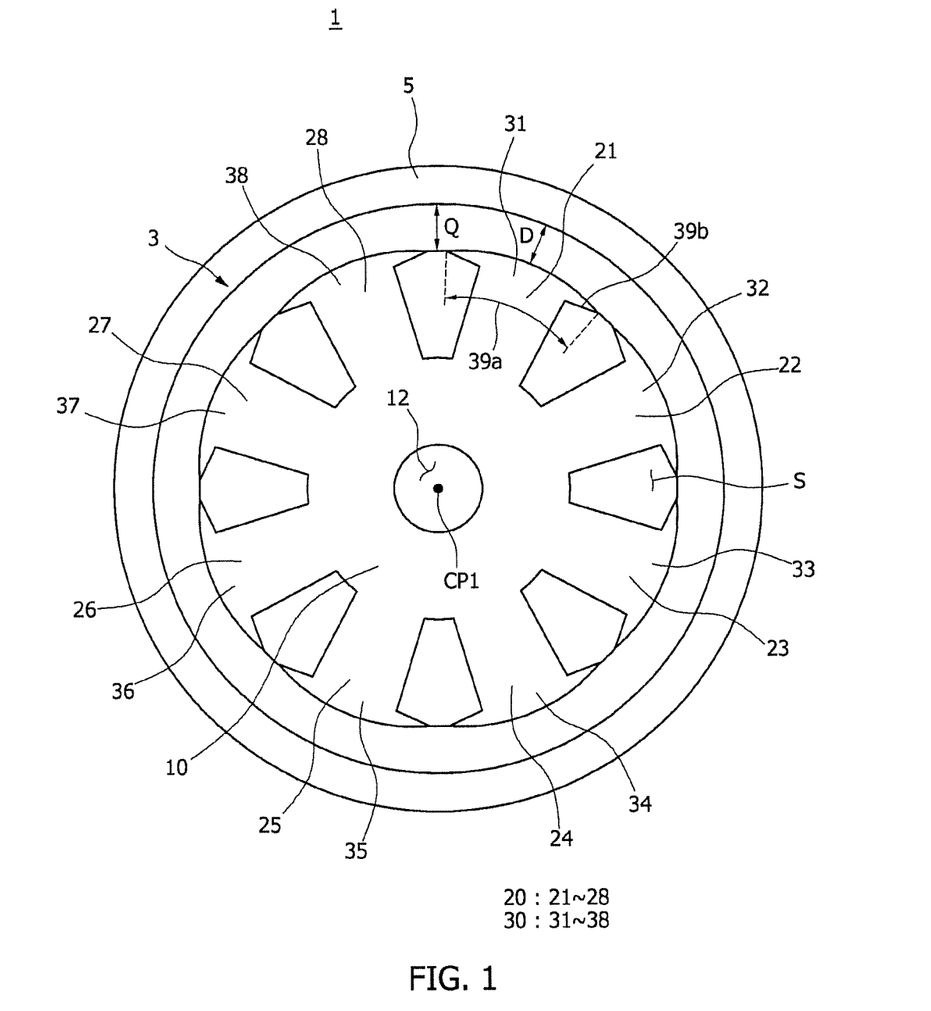
FIG. 1 is a plan view illustrating a wound-rotor motor having a rotor for a wound-rotor motor according to one embodiment of the present invention.

FIG. 1 is a plan view illustrating a wound-rotor motor having a rotor for a wound-rotor motor according to one embodiment of the present invention.

Referring to FIG. 1, in one embodiment of the present invention, a wound-rotor motor 1 including a rotor 3 for a wound-rotor motor may include the rotor 3 for a wound-rotor motor and a stator 5.

Meanwhile, in one embodiment of the present invention, the rotor 3 may be located in the stator 5, and an inner side surface of the stator 5 may be disposed to be spaced apart from an outer circumferential surface of the rotor 3.

In addition, a plurality of slots may be formed in an inner circumferential surface of the stator 5. Here, stator coils may be wound in the plurality of slots (not shown), and when electric power is supplied to the stator 5, an armature current may flow through the stator coils wound in the slots, the stator 5 may serve as an electromagnet, and thus a N-pole or S-pole may be formed.

Referring to FIG. 1, the rotor 3 according to one embodiment of the present invention may be disposed in the stator 5 to be spaced a predetermined distance therefrom and include a rotor core 10, teeth portions 20, field coils (not shown), and pole shoes 30.

Meanwhile, in one embodiment of the present invention, the rotor core 10 may have a cylindrical shape and a central portion having a hollow 12 coupled to a shaft (not shown) such that the rotor is rotatable. In addition, in one embodiment of the present invention, the teeth portions 20 may be formed in a bar shape on an outer circumferential surface of the rotor core 10 to protrude outward in a radial direction.

Meanwhile, in one embodiment of the present invention, a plurality of teeth portions 20 may be formed. Here, as illustrated in FIG. 1, the plurality of teeth portions 20 may include eight teeth portions 20 such as first to eighth teeth portions 21 to 28, but the plurality of teeth portions 20 are not limited thereto.

Referring to FIG. 1, in one embodiment of the present invention, the first to eighth teeth portions 21 to 28 may be disposed on the outer circumferential surface of the rotor core 10 to be spaced a constant distance from each other.

Here, an output of the rotor 3 may be adjusted by a field current generated when power is supplied to field coils (not shown) wound around the first to eighth teeth portions 21 to 28 and an armature current generated by the stator coil.

Meanwhile, in one embodiment of the present invention, eight winding regions S at which the field coils may be wound around the teeth portions 20 may be formed between the first to eighth teeth portions 21 to 28. Here, the winding regions S may be spaces by which the teeth portions 20 are spaced apart from each other when the plurality of teeth portions 20 are disposed on the outer circumferential surface of the rotor core 10 in a circumferential direction.

That is, referring to FIG. 1, the eight winding regions S, in which the field coils may be wound, may be each formed between the first teeth portion 21 and the second teeth portion 22, between the second teeth portion 22 and the third teeth portion 23, between the third teeth portion 23 and the fourth teeth portion 24, between the fourth teeth portion 24 and the fifth teeth portion 25, between the fifth teeth portion 25 and the sixth teeth portion 26, between the sixth teeth portion 26 and the seventh teeth portion 27, between the seventh teeth portion 27 and the eighth teeth portion 28, and between the eighth teeth portion 28 and the first teeth portion 21.

Meanwhile, in one embodiment of the present invention, the pole shoes 30 may be formed at end portions of the teeth portions 20. Here, in one embodiment of the present invention, a plurality of pole shoes 30 may be formed at the plurality of teeth portions 20.

In addition, in one embodiment of the present invention, the pole shoes 30 may have an arcuate shape, and both end portions of the pole shoes 30 may extend toward the outside of both side surfaces of the teeth portions 20. Here, the pole shoes 30 may be integrally formed with the teeth portions 20, but are not limited thereto.

In one embodiment of the present invention, the pole shoes 30 may have a structure capable of affecting an output torque and a torque ripple, that is, increasing the torque while decreasing the torque ripple by having a sine wave current distribution characteristic.

Figure 2:
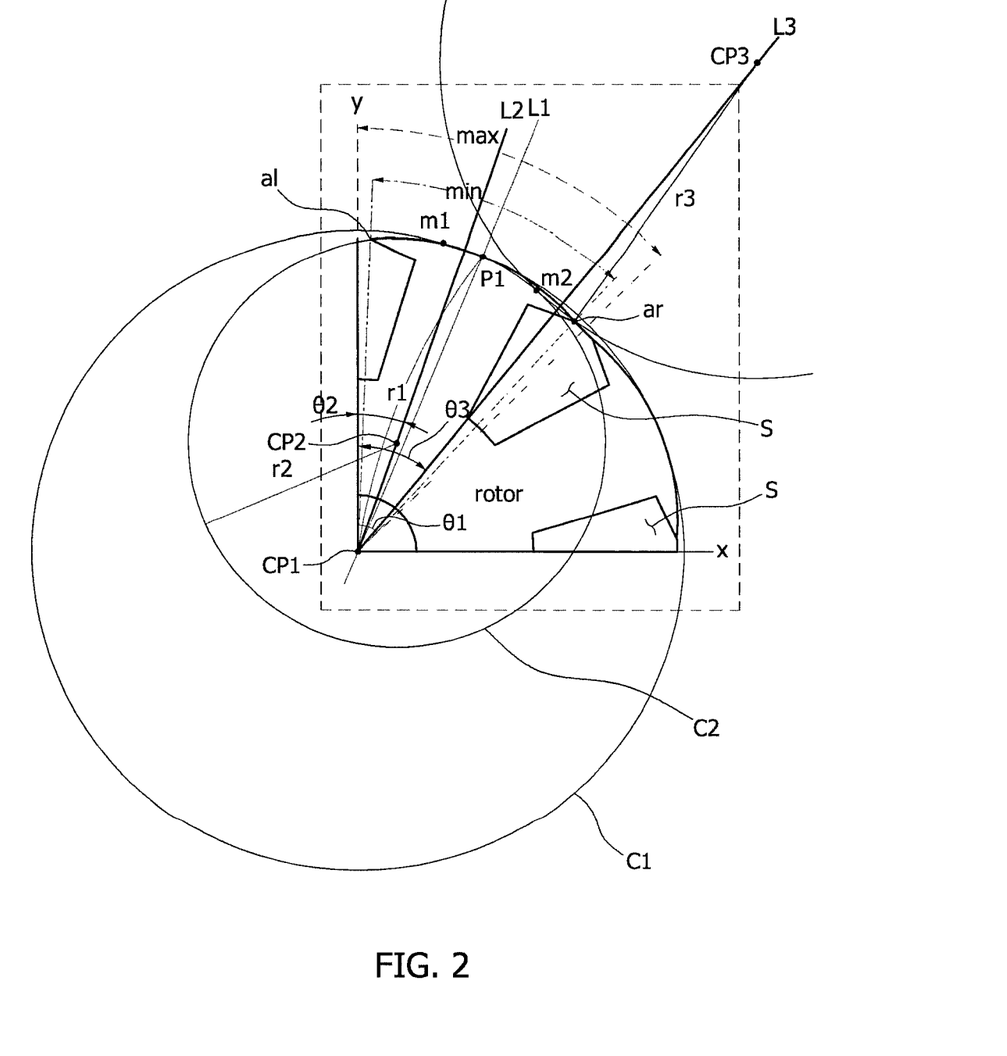
FIG. 2 is a plan view illustrating the rotor for a wound-rotor motor according to one embodiment of the present invention.
Figure 3:
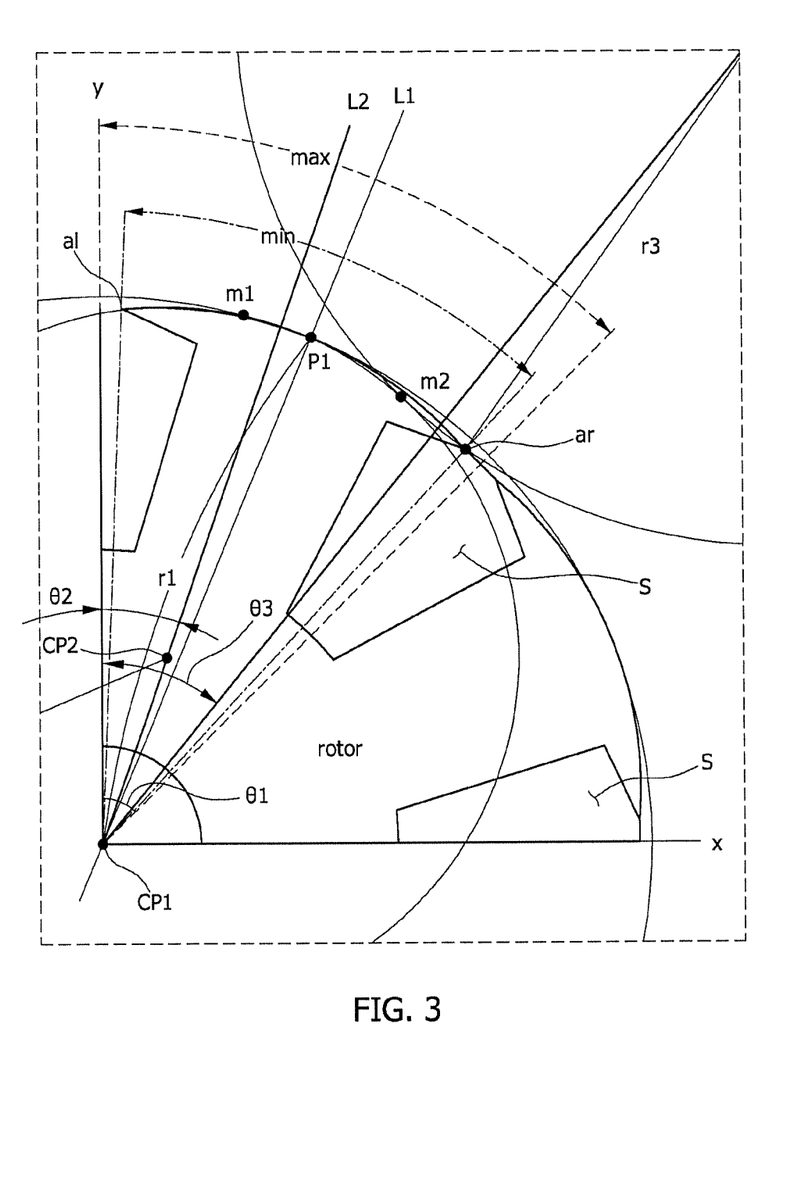
FIG. 3 is an enlarged view illustrating a partial area of FIG. 2.

Referring to FIGS. 2 and 3, in one embodiment of the present invention, the pole shoes 30 may include pole shoe outer side surfaces 39a and pole shoe inner side surfaces 39b. Here, in one embodiment of the present invention, cross sections of pole shoe outer side surfaces 39a may have an arc shape and may be disposed to face and be spaced apart from the inner circumferential surface of the stator 5. In addition, cross sections of the pole shoe inner side surfaces 39b may have a straight line shape and connect the teeth portions 20 and the pole shoe outer side surfaces 39a.

Meanwhile, the plurality of teeth portions 20 may have the pole shoes including the same pole shoe outer side surfaces 39a and the same pole shoe inner side surfaces 39b, but are not limited thereto, and curvatures of the pole shoe outer side surfaces may be different according to positions of the pole shoes in order to improve the sine wave current distribution characteristic.

Referring to FIG. 1, in one embodiment of the present invention, a pole shoe 30 may form a first air gap G1 by a pole shoe outermost position P1 and the inner side surface of the stator 5 being spaced a distance D from each other. In addition the pole shoe 30 may form a second air gap G2 by both pole shoe end positions al and ar and the inner side surface of the stator 5 being spaced a distance Q from each other.

Meanwhile, in one embodiment of the present invention, the first air gap G1 may be smaller than the second air gap G2. That is, in one embodiment of the present invention, a distance from the pole shoe outer side surfaces 39a to the inner side surface of the stator 5 may be greater than the distance D and less than the distance Q.

Here, in one embodiment of the present invention, the distance from the pole shoe outer side surfaces 39a to the inner side surface of the stator 5 may be different according to a curvature of a pole shoe outer side surface. Accordingly, a torque ripple can be decreased by adjusting the air gap which is the distance from the pole shoe outer side surface 39a to the inner side surface of the stator 5.

Referring to FIG. 1, in one embodiment of the present invention, the plurality of teeth portions 20 may be the first to eighth teeth portions 21 to 28, but are not limited thereto. However, in one embodiment of the present invention, eight teeth portions are described to describe a design of an outer side surface of the pole shoe below.

In one embodiment of the present invention, the eight teeth portions 20 may include a first teeth portion 21, a second teeth portion 22, a third teeth portion 23, a fourth teeth portion 24, a fifth teeth portion 25, a sixth teeth portion 26, a seventh teeth portion 27, and an eighth teeth portion 28. Here, the eight teeth portions 20 which are the teeth portions 21 to 28 may be disposed to be spaced 45° from each other, wherein 45° is calculated by dividing 360° by eight.

That is, in one embodiment of the present invention, n teeth portions 20 may be disposed to be spaced 360/n degrees from each other.

Meanwhile, in one embodiment of the present invention, winding regions may be formed in a space between a left end position al1 of a first pole shoe and a right end position ar8 of an eighth pole shoe and a space between a right end position ar1 of the first pole shoe and a left end position al2 of a second pole shoe.

The rotor 3 for a wound-rotor motor according to one embodiment of the present invention may decrease a torque ripple while a total size of motor does not increase and a torque does not decrease by designing the pole shoe outer side surface 39a according to one embodiment of the present invention.

Referring to FIGS. 2 and 3, in one embodiment of the present invention, a vertical line y may be an imaginary extension line which connects a central point CP1 of the hollow 12 of the rotor core 10 and a center of the winding region S, and a horizontal line x may an imaginary extension line formed perpendicularly to the vertical line y and configured to pass the central point CP1.

Here, a first rotation angle $\theta 1$ may be a rotation angle from the left end position al1 of the first pole shoe to the right end position ar1 of the first pole shoe. That is, a first rotation angle $\theta 1$ may be an angle between the both end positions of the first pole shoe and may range from 18° to 45°.

Accordingly, when the first rotation angle $\theta 1$ is 45°, the left end position al1 of the first pole shoe may be connected to the right end position ar8 of the eighth pole shoe, and the right end position ar1 of the first pole shoe may be connected to the left end position al2 of the second pole shoe. That is, end portions of the first to eighth pole shoes 31 to 38 may be connected.

In addition, when the first rotation angle $\theta 1$ is 18°, the left end position al1 of the first pole shoe may be disposed to be spaced apart from the right end position ar8 of the eighth pole shoe, and the right end position ar1 of the first pole shoe may be disposed to be spaced apart from the left end position al2 of the second pole shoe. That is, the end portions of the first to eighth pole shoes 31 to 38 may be disposed to be spaced apart from each other.

Referring to FIGS. 2 and 3, in one embodiment of the present invention, a first imaginary circle C1 may be an imaginary circle having a first radius r1 which is a distance from the first central point CP1 to the first pole shoe outermost position P1.

Meanwhile, in one embodiment of the present invention, a second rotation angle $\theta 2$ may be an angle that the vertical line y rotates in a rightward direction. Here, the second rotation angle θ2 may range from 10% of the first rotation angle θ1 to 20% of the first rotation angle.

In addition, a second imaginary line L2 may be an imaginary extension line rotated about the first central point CP1 of the first imaginary circle C1 at the second rotation angle θ2 from the vertical line y. Here, a second central point CP2 of a second imaginary circle C2 is located on the second imaginary line L2, and a second radius r2 may range from 60% of the first radius r1 to 80% of the first radius r1.

Meanwhile, the second imaginary circle C2 may be internally tangent to the first imaginary circle C1 at a first intersection point m1. Here, the second radius r2, which is a distance from the first intersection point m1 to the second central point CP2, of the second imaginary circle C2 may range from 60% of the first radius r1 to 80% of the first radius r1.

In addition, a distance from the second central point CP2 of the second imaginary circle C2 to the first central point CP1 of the first imaginary circle C1 may be the same as a difference between the first radius r1 of the first imaginary circle and the second radius r2 of the second imaginary circle. Here, the second central point CP2 of the second imaginary circle C2 may be positioned on the second imaginary line L2.

Referring to FIGS. 2 and 3, in one embodiment of the present invention, a third rotation angle θ3 may be an angle that the vertical line y rotates in the rightward direction. Here, the third rotation angle θ3 may range from 80% of the first rotation angle θ1 to 90% of the first rotation angle θ1.

In addition, a third imaginary line L3 may be an imaginary extension line which rotates about the first central point CP1 at the third rotation angle θ3 from the vertical line y and extends. Here, a third central point CP3 of a third imaginary circle C3 may be positioned on the third imaginary line L3, and a third radius r3 may range from 110% of the first radius r1 to 125% of the first radius r1.

Meanwhile, the third imaginary circle C3 may be externally tangent to the second imaginary circle C2 at a second intersection point m2. In addition, the third radius r3 of the third imaginary circle C3, which is a distance from the right end position ar1 of the first pole shoe to the third central point CP3, may range 110% of the first radius r1 to 125% of the first radius r1.

A cross-sectional area from the first pole shoe left end position al1 to the first intersection point m1 of the first pole shoe outer side surface 39a of the rotor 3 for a wound-rotor motor according to one embodiment of the present invention may be formed along the first imaginary circle C1, a cross-sectional area from the first intersection point m1 to the second intersection point m2 thereof may be formed along the second imaginary circle C2, and a cross-sectional area from the second intersection point m2 to the first pole shoe right end position ar1 may be formed along the third imaginary circle C3.

In addition, in a first modified embodiment of a rotor 3 for a wound-rotor motor according to one embodiment of the present invention, a cross-sectional area from a first pole shoe left end position al1 to a first pole shoe outermost position P1 of a first pole shoe outer side surface 39a may be formed along a first imaginary circle C1, a cross-sectional area from the first pole shoe outermost position P1 to a second intersection point m2 may be formed along a second imaginary circle C2, and a cross-sectional area from the second intersection point m2 to a first pole shoe right end position ar2 may be formed along a third imaginary circle C3.

Figure 4:
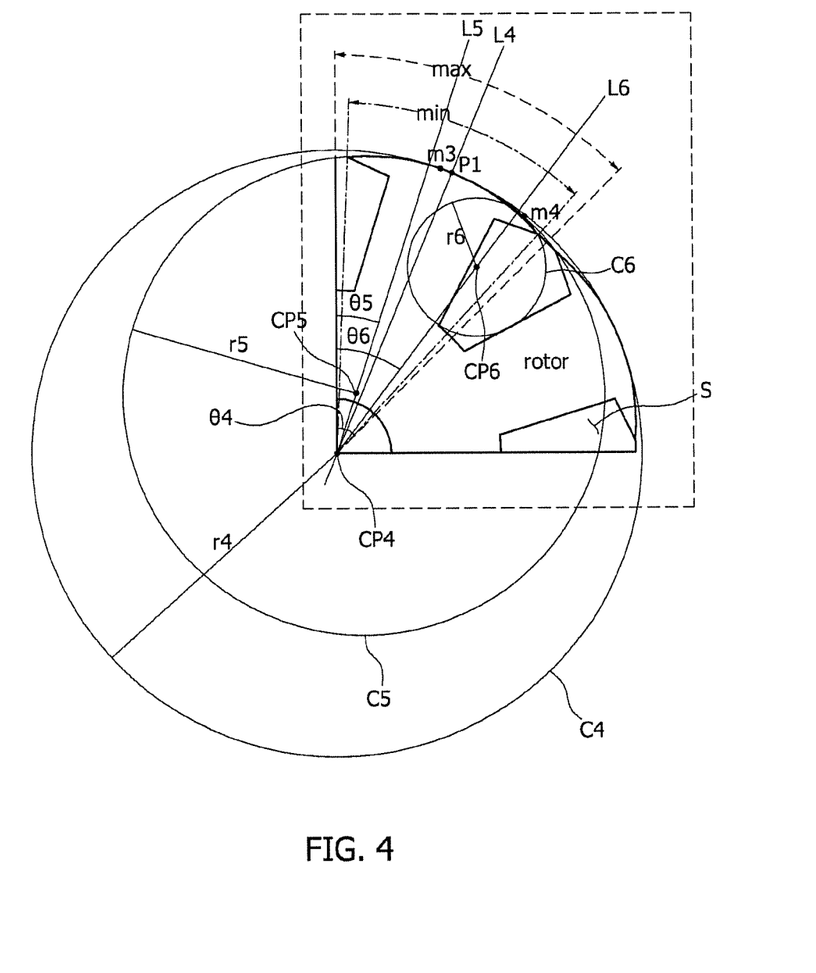
FIG. 4 is a plan view illustrating a modified example of the rotor for a wound-rotor motor according to one embodiment of the present invention.
Figure 5:
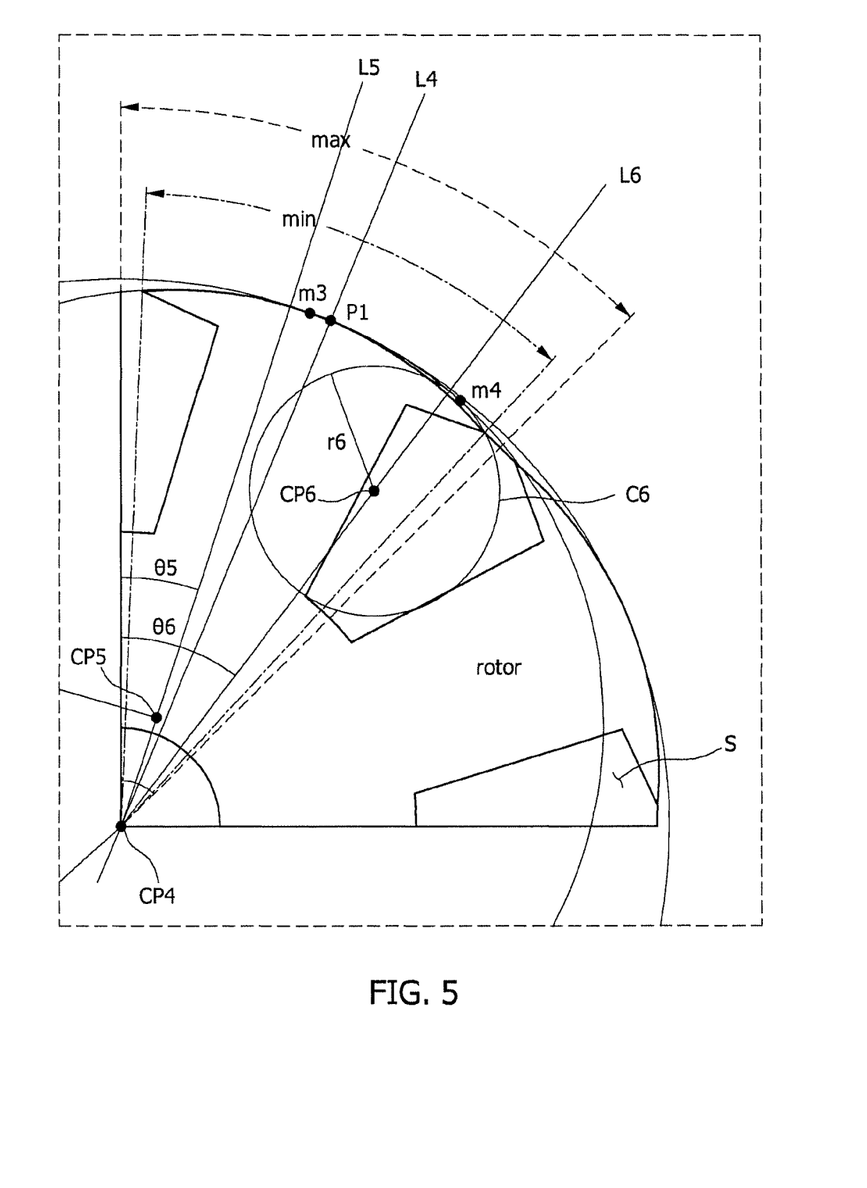
FIG. 5 is an enlarged view illustrating a partial area of FIG. 4.

Referring to FIGS. 4 and 5, in a modified embodiment of the present invention, a rotor 103 for a wound-rotor motor may decrease a torque ripple while a total size of a motor does not increase and a torque does not decrease by designing a first pole shoe outer side surface 139a.

In one embodiment of the present invention, a fourth imaginary circle C4 may be an imaginary circle having a fourth radius r4 which is a distance from a fourth central point CP4 to the first pole shoe outermost position P1.

Here, a fourth rotation angle θ4 may be a rotation angle from the left end position al1 of the first pole shoe to the right end position ar1 of the first pole shoe. That is, the fourth rotation angle θ4 may be an angle between the both end positions of the first pole shoe and may range from 18° to 45°.

Accordingly, when the fourth rotation angle θ4 is 45°, the left end position al1 of the first pole shoe is connected to the right end position ar8 of the eighth pole shoe, and the right end position ar1 of the first pole shoe may be connected to the end position al2 of the second pole shoe. That is, the end portions of the first to eighth pole shoes 31 to 38 may be connected.

In addition, when the fourth rotation angle θ4 is 18°, the left end position al1 of the first pole shoe is disposed to be spaced apart from the right end position ar8 of the eighth pole shoe, and the right end position ar1 of the first pole shoe may be disposed to be spaced apart from the left end position al2 of the second pole shoe. That is, the end portions of the first to eighth pole shoes 31 to 38 may be disposed to be spaced apart from each other.

Meanwhile, in one embodiment of the present invention, a fifth rotation angle θ5 may be an angle that the vertical line y rotates in the rightward direction. Here, the fifth rotation angle θ5 may range from 40% of the fourth rotation angle θ4 to 50% of the fourth rotation angle θ4.

In addition, a fourth imaginary line L4 may be an imaginary extension line which rotates about the fourth central point CP4 of the fourth imaginary circle C4 at the fifth rotation angle θ5 from the vertical line y and extends. Here, a fifth central point CP5 of a fifth imaginary circle C5 may be positioned on a fifth imaginary line L5, and a fifth radius r5 may range from 50% of the fourth radius r4 to 70% of the fourth radius r4.

Meanwhile, the fifth imaginary circle C5 may be internally tangent to the fourth imaginary circle C4 at a third intersection point m3. Here, the fifth radius r5, which is a distance from the third intersection point m3 to the fifth central point CP5, of the fifth imaginary circle C5 is 50% of the fourth radius r4 to 70% of the fourth radius r4.

In addition, a distance from the fifth central point CP5 of the fifth imaginary circle C5 to the fourth central point CP4 of the fourth imaginary circle C4 may be the same as a difference between the fourth radius r4 of the fourth imaginary circle and the fifth radius r5 of the fifth imaginary circle. Here, the fifth central point CP5 of the fifth imaginary circle C5 may be positioned on the fifth imaginary line L5.

Referring to FIGS. 2 and 3, in one embodiment of the present invention, a sixth rotation angle θ6 may be an angle that the vertical line y rotates in the rightward direction, Here, the sixth rotation angle θ5 may range from 60% of the fourth rotation angle θ4 to 70% of the fourth rotation angle θ4.

In addition, a sixth imaginary line L6 may be an imaginary extension line which rotates about the fourth central point CP4 of the fourth imaginary circle C4 at the sixth rotation angle θ6 from the vertical line y and extends. Here, a sixth central point CP6 of the sixth imaginary circle C6 is positioned on the sixth imaginary line L6, and the sixth radius r6 may range from 10% of the fourth radius r4 to 30% of the fourth radius r4.

Meanwhile, the sixth imaginary circle C6 may be internally tangent to the fifth imaginary circle C5 at a fourth intersection point m4. In addition, a sixth radius r6, which is a distance from the right end position ar1 of the first pole shoe to the sixth central point CP6, of the sixth imaginary circle C6 may range from 10% of the fourth radius r4 to 30% of the fourth radius r4.

A cross-sectional area from a first pole shoe left end position al1 to the third intersection point m3 of the first pole shoe outer side surface 139a of the rotor 103 for a wound-rotor motor according to one embodiment of the present invention may be formed along the fourth imaginary circle C4, a cross-sectional area from the third intersection point m3 to the fourth intersection point m4 thereof may be formed along the fifth imaginary circle C5, and a cross-sectional area from the fourth intersection point m4 to the first pole shoe right end position ar1 thereof may be formed along the sixth imaginary circle C6.

A cross-sectional area from the first pole shoe left end position al1 to a first pole shoe outermost position P1 of the first pole shoe outer side surface 139a of the rotor 103 for a wound-rotor motor according to one embodiment of the present invention may be formed along the fourth imaginary circle C4, a cross-sectional area from the first pole shoe outermost position P1 to the fourth intersection point m4 thereof may be formed along the fifth imaginary circle C5, and a cross-sectional area from the fourth intersection point m4 to a first pole shoe right end position ar1 thereof may be formed along the sixth imaginary circle C6.

In one embodiment of the present invention, since a gap between an end portion of the pole shoe outer side surface 39a of the pole shoes 30 and the inner side surface of the stator 5 is not formed to be excessively wide, a torque ripple can decrease while preventing an increase in a size of the wound-rotor motor 1.

Figure 6:
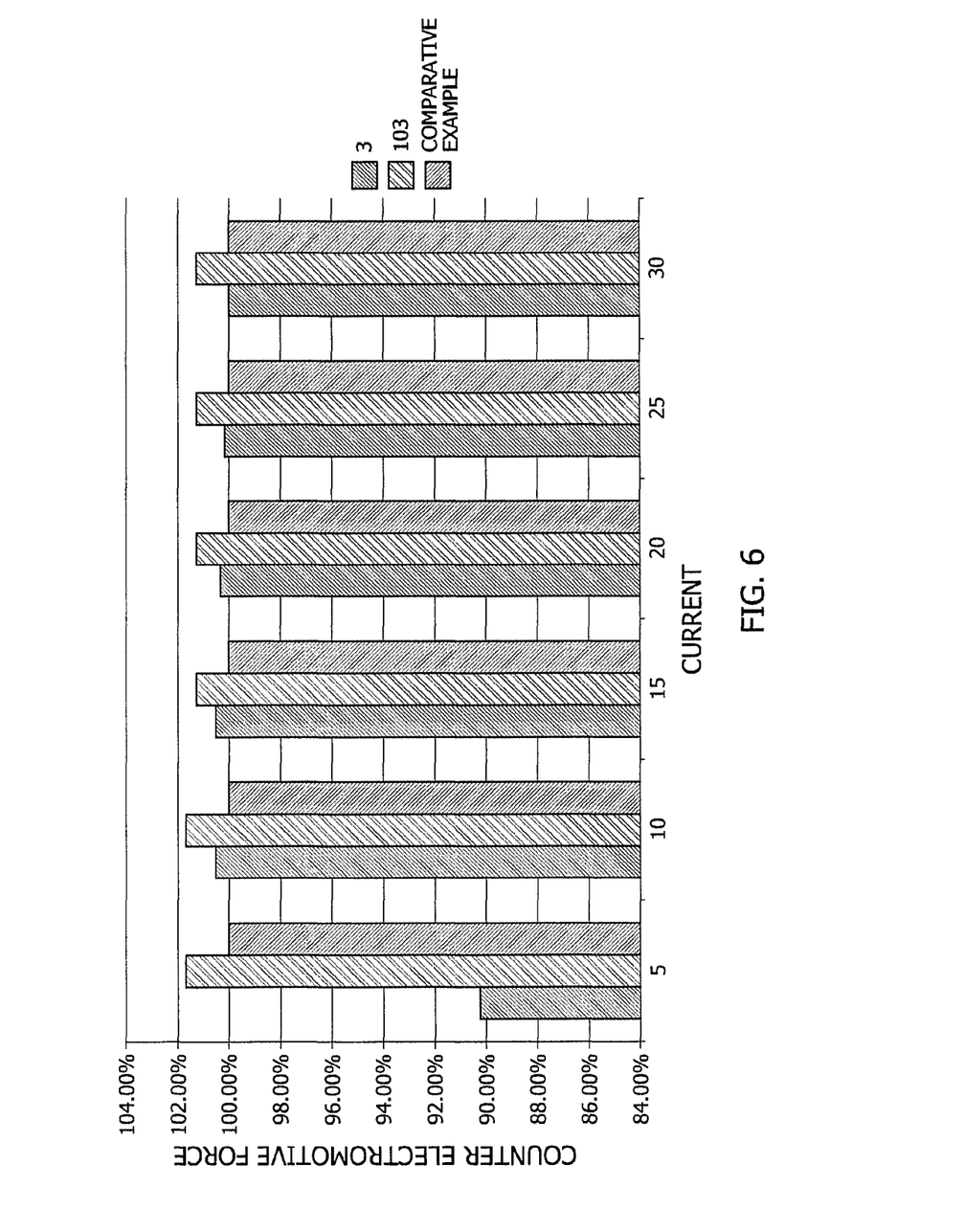
FIG. 6 is a graph showing a magnitude of a counter electromotive force based on a set ratio of the rotor for a wound-rotor motor according to one embodiment of the present invention.
Figure 7:
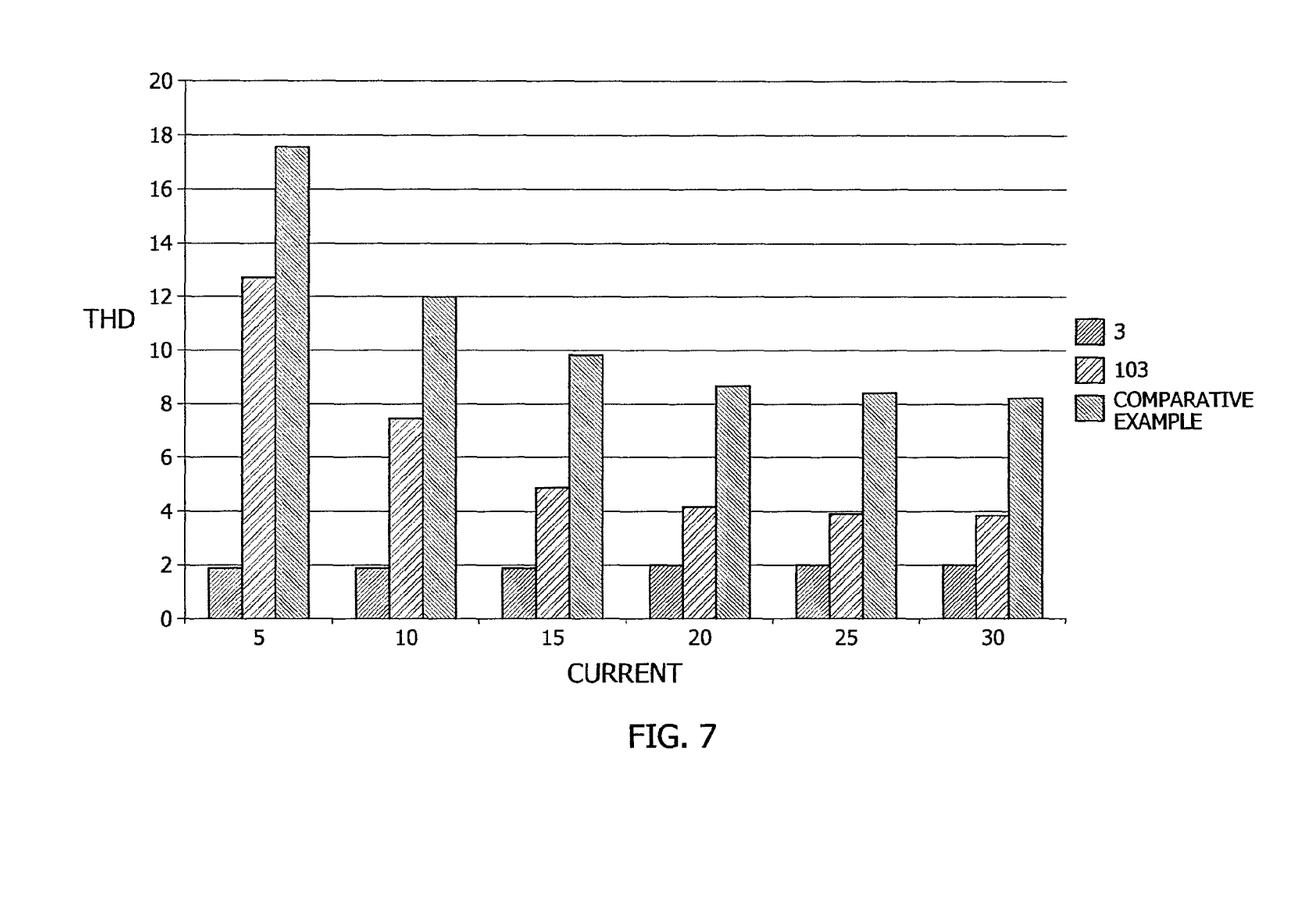
FIG. 7 is a graph showing a total harmonic distortion (THD) value based on the set ratio of the rotor for a wound-rotor motor according to one embodiment of the present invention.

FIG. 6 is a graph showing a magnitude of a counter electromotive force based on a set ratio of the rotor for a wound-rotor motor according to one embodiment of the present invention, and FIG. 7 is a graph showing a total harmonic distortion (THD) value based on the set ratio of the rotor for a wound-rotor motor according to one embodiment of the present invention.

In one embodiment of the present invention, an analysis of how harmonic waves are mixed in a pure sine wave is referred as a THD analysis. When a harmonic wave is mixed in a pure sine wave, a waveform may be distorted. When the pure sine wave is assumed as a fundamental frequency, a degree of distortion of a waveform may be seen through a magnitude calculated by dividing a sum of harmonic waves by the fundamental frequency. That is, as a value of THD is decreased, a waveform is close to the sine wave and thus an output of a motor is improved.

Referring to FIGS. 6 and 7, in one embodiment of the present invention, in the case in which the third imaginary circle C3 is externally tangent to the first imaginary circle C1, it can be seen that a THD of the rotor 3 for a wound-rotor motor is 2% which is the smallest THD while a counter electromotive force thereof is maintained similarly to that of a comparative example.

In one embodiment of the present invention, in the case in which the sixth imaginary circle C6 is internally tangent to the fourth imaginary circle C4, it can be seen that a THD of the rotor 103 for a wound-rotor motor is in the range of 4 to 12%, which is less than that of the comparative example while a counter electromotive force is maintained similarly to that of the comparative example.

Accordingly, since a THD value of the rotor 3 or 103 for a wound-rotor motor according to one embodiment of the present invention is low while a counter electromotive force is constantly maintained, an output of a motor can be improved compared to that of the comparative example.

As described above, a rotor for a wound-rotor motor and a wound-rotor motor having the same according to one embodiment of the present invention can maintain a magnitude of a counter electromotive force to be a predetermined level or more and decrease a THD by designing an external shape of a pole shoe according to one embodiment of the present invention.

A rotor for a wound-rotor motor and a wound-rotor motor having the same according to one embodiment of the present invention can prevent an increase in a total size of a wound-rotor motor while decreasing a torque ripple and increasing a torque by designing an external shape of a pole shoe according to one embodiment of the present invention.

While one embodiment of the present invention has been described above, the spirit of the present invention is not limited to the described embodiments in the specification, those skilled in the art may easily propose different embodiments by adding, modifying, removing, supplementing components and the like within the same spiritual range, and these will also fall in the range of the spirit of the present invention.

[Reference Numerals]

| | |
|---|---|
| 1: MOTOR | 3, 103: ROTOR |
| 5: STATOR | 10: ROTOR CORE |
| 12: HOLLOW | 20: TEETH PORTIONS |
| 21 to 28: FIRST TO EIGHTH TEETH PORTIONS | |
| 30: POLE SHOES | |
| 31 to 38: FIRST TO EIGHTH POLE SHOES | |
| 39a, 139a: POLE SHOE OUTER SIDE SURFACE | |
| 39b, 139b: POLE SHOE INNER SIDE SURFACE | |

What is claimed is:

1. A rotor for a wound-rotor motor, comprising:
a rotor core including a hollow defined in a central portion thereof and coupled to a shaft;
a teeth portion radially disposed on an outer side surface of the rotor; and
a pole shoe extending from an end portion of the teeth portion in one direction and including a part of a cross section of an outer side surface having an arc shape of a first imaginary circle (C1) having a first radius (r1) which is a distance from a central point (CP1) of the hollow to an outermost position (P1) thereof,
wherein the teeth portion and the pole shoe includes n teeth portions and n pole shoes,
wherein the n teeth portions are disposed on an outer circumferential surface of the rotor core in a circumferential direction to be spaced 360/n degrees from each other,
winding regions in which coils are wound are defined between the n teeth portions,
when an outer side surface of each of the n pole shoes extends from one end position to the other end position of the pole shoe at a first rotation angle in a direction in which the rotor rotates, the first rotation angle ranges from 18° to 45°, wherein a part of a cross section of the outer side surface of the pole shoe has an arc shape of a second imaginary circle (C2) having a second central point (CP2) and a second radius (r2), wherein the second imaginary circle is internally tangent to the first imaginary circle at a first intersection point, wherein the second central point (CP2) is spaced apart from a central point (CP1) of the first imaginary circle by a difference between the first radius and the second radius, wherein at least of a part of a cross section of the outer side surface of the pole shoe has an arc shape of a third imaginary circle (C3) having a third central point (CP3) and a third radius (r3), wherein the third imaginary circle is externally tangent to the second imaginary circle at a second intersection point, and wherein the third radius (r3) ranges from 110% of the first radius (r1) to 125% of the first radius r1.

2. The rotor for a wound-rotor motor of claim 1, wherein the second radius (r2) ranges from 60% of the first radius (r1) to 80% of the first radius (r1).

3. The rotor for a wound-rotor motor of claim 1, wherein the second radius (r2) ranges from 50% of the first radius (r1) to 70% of the first radius (r1).

4. The rotor for a wound-rotor motor of claim 1, wherein each of the first rotation angle, a second rotation angle, and a third rotation angle is an angle at which a first imaginary line, which passes the one end position of the pole shoe and the central point (CP1), is inclined in a rotational direction of the rotor.

5. The rotor for a wound-rotor motor of claim 4, wherein the second central point is positioned on a second imaginary line spaced the second rotation angle from the first imaginary line in the rotational direction of the rotor and configured to extend from the first central point.

6. The rotor for a wound-rotor motor of claim 5, wherein the third central point is positioned on a third imaginary line spaced the third rotation angle from the first imaginary line in the rotational direction of the rotor and configured to extend from the first central point.

7. The rotor for a wound-rotor motor of claim 4, wherein the second rotation angle ranges from 10% of the first rotation angle ($\theta 1$) to 20% of the first rotation angle ($\theta 1$).

8. The rotor for a wound-rotor motor of claim 4, wherein the second rotation angle ranges from 40% of the first rotation angle ($\theta 1$) to 50% of the first rotation angle ($\theta 1$).

9. The rotor for a wound-rotor motor of claim 4, wherein the third rotation angle ranges from 80% of the first rotation angle ($\theta 1$) to 90% of the first rotation angle ($\theta 1$).

10. The rotor for a wound-rotor motor of claim 4, wherein the third rotation angle ranges from 60% of the first rotation angle ($\theta 1$) to 70% of the first rotation angle ($\theta 1$).

11. The rotor for a wound-rotor motor of claim 6, wherein a cross section from the one end position of the pole shoe to the first intersection point (m1) of the outer side surface of the pole shoe has the arc shape of the first imaginary circle (C1), wherein a cross section from the first intersection point (m1) to the second intersection point (m2) has the arc shape of the second imaginary circle (C2), and wherein a cross section from the second intersection point (m2) to the other end position of the pole shoe has the arc shape of the third imaginary circle (C3).

12. The rotor for a wound-rotor motor of claim 6, wherein a cross section from the one end position of the pole shoe to an outermost position of the pole shoe has the arc shape of the first imaginary circle (C1), wherein a cross section from the outermost position of the pole shoe to the second intersection point (m2) has the arc shape of the second imaginary circle (C2), and wherein a cross section from the second intersection point (m2) to the other end position of the pole shoe has the arc shape of the third imaginary circle (C3).

13. A wound-rotor motor comprising:

the rotor of claim 1; and a stator configured to cover an outer circumferential surface of the rotor and disposed to be spaced apart from the outer circumferential surface of the rotor.

14. A rotor for a wound-rotor motor, comprising:

a rotor core including a hollow defined in a central portion thereof and coupled to a shaft;

a teeth portion radially disposed on an outer side surface of the rotor; and a pole shoe extending from an end portion of the teeth portion in one direction and including a part of a cross section of an outer side surface having an arc shape of a first imaginary circle (C1) having a first radius (r1) which is a distance from a central point (CP1) of the hollow to an outermost position (P1) thereof, wherein the teeth portion and the pole shoe includes n teeth portions and n pole shoes, wherein the n teeth portions are disposed on an outer circumferential surface of the rotor core in a circumferential direction to be spaced 360/n degrees from each other, winding regions in which coils are wound are defined between the n teeth portions, when an outer side surface of each of then pole shoes extends from one end position, to the other end position of the pole shoe at a first rotation angle in a direction in which the rotor rotates, the first rotation angle ranges from 18° to 45°, wherein a part of a cross section of the outer side surface of the pole shoe has an arc shape of a second imaginary circle (C2) having a second central point (CP2) and a second radius (r2), wherein the second imaginary circle is internally tangent to the first imaginary circle at a first intersection point, wherein the second central point (CP2) is spaced apart from a central point (CP1) of the first imaginary circle by a difference between the first radius and the second radius, wherein at least a part of a cross section of the outer side surface of the pole shoe has an arc shape of a third imaginary circle (C3) having a third central point (CP3) and a third radius (r3);

wherein the third imaginary circle is internally tangent to the second imaginary circle at a second intersection point, and wherein the third radius (r3) ranges from 10% of the first radius (r1) to 30% of the first radius (r1).

15. The rotor for a wound-rotor motor of claim 14, wherein each of the first rotation angle, a second rotation angle, and a third rotation angle is an angle at which a first imaginary line, which passes the one end position of the pole shoe and the central point (CP1), is inclined in a rotational direction of the rotor.

* * * * *